(12) United States Patent
Koo et al.

(10) Patent No.: US 7,233,151 B2
(45) Date of Patent: Jun. 19, 2007

(54) APPARATUS AND METHOD FOR DIAGNOSING FAILURE OF FUEL LEVEL SENSORS

(75) Inventors: Bon-Chang Koo, Hwaseong-si (KR);
Chul-Soo Yook, Hwaseong-si (KR);
Bong-Kyo Seo, Hwaseong-si (KR);
Chi-Kyung Kim, Hwaseong-si (KR)

(73) Assignee: Hyundai Motor Company, Seocho-Ku, Seoul (KR)

( * ) Notice: Subject to any disclaimer, the term of this patent is extended or adjusted under 35 U.S.C. 154(b) by 0 days.

(21) Appl. No.: 11/299,387

(22) Filed: Dec. 8, 2005

(65) Prior Publication Data

US 2007/0108985 A1 May 17, 2007

(30) Foreign Application Priority Data

Nov. 11, 2005 (KR) ...................... 10-2005-0108179

(51) Int. Cl.
*G01R 31/08* (2006.01)
*G01R 31/00* (2006.01)

(52) U.S. Cl. ...................... 324/522; 324/503
(58) Field of Classification Search ................ 324/522, 324/503; 60/274; 73/23.32
See application file for complete search history.

(56) References Cited

U.S. PATENT DOCUMENTS 5,421,202 A * 6/1995 Le Pimpec .................. 73/295

6,136,169 A * 10/2000 Okamoto .................... 204/401

FOREIGN PATENT DOCUMENTS

| JP | 55-078140 | 6/1980 |
|---|---|---|
| JP | 02-130261 | 5/1990 |
| JP | 07-150974 | 6/1995 |
| JP | 07-233764 | 9/1999 |
| JP | 2002-257772 | 9/2002 |

* cited by examiner

*Primary Examiner*—Anjan K. Deb
*Assistant Examiner*—Amy He
(74) *Attorney, Agent, or Firm*—Morgan Lewis & Bockius LLP

(57) ABSTRACT

A method of diagnosing failure of fuel level sensors includes a first measuring step of measuring voltages from first and second failure detection terminals; if the voltage is higher than a reference, diagnosing the voltage as "high," and if the voltage is lower than a reference, diagnosing the voltage as "low;" and if the voltage is neither high nor low: a second measuring step of receiving the voltages from the first and second failure detection terminals; calculating and storing a difference between the voltages of the first and second failure detection terminals; determining whether an amount of fuel is reduced; if the amount of fuel is reduced, calculating a difference between voltage signals of the first and second failure detection terminals; determining whether the voltage difference before and after the amount of fuel was reduced are identical; and if the voltage differences are identical, returning to the first measuring step.

4 Claims, 6 Drawing Sheets

FIG.3a

| Node # | Failure Mode | measured V1 | measured V2 | diagnosis |
|---|---|---|---|---|
| 1 | Open | Zero V | Zero V | Short to GND |
| 1 | Short to High | High V (up to 5V) | High V (up to 5V) | Short to Vbatt |
| 1 | Short to GND | Zero V | Zero V | Short to GND |

FIG.3b

| Node # | Failure Mode | measured V1 | measured V2 | diagnosis |
|---|---|---|---|---|
| 2 | Open | High V (up to 5V) | Zero V | Short to GND |
| 2 | Short to High | High V (up to 5V) | High V (up to 5V) | Short to Vbatt |
| 2 | Short to GND | Zero V | Zero V | Short to GND |

FIG.3c

| Node # | Failure Mode | measured V1 | measured V2 | diagnosis |
|---|---|---|---|---|
| 3 | Open | Zero V | Unaffected | Short to GND (V1) |
| 3 | Short to High | High V (up to 5V) | High V (up to 5V) | Short to Vbatt |
| 3 | Short to GND | Zero V | Zero V | Short to GND |

FIG.3d

| Node # | Failure Mode | measured V1 | measured V2 | diagnosis |
|---|---|---|---|---|
| 4 | Open | High V (up to 5V) | Zero V | Short to GND (V2) Short to Vbatt (V1) |
| 4 | Short to High | High V (up to 5V) | High V (up to 5V) | Short to Vbatt |
| 4 | Short to GND | Non-Zero, abnormal | Zero V | Short to GND (V2) |

FIG.3e

| Node # | Failure Mode | measured V1 | measured V2 | diagnosis |
|---|---|---|---|---|
| 5 | Open | Unaffected | Zero V | Short to GND (V2) |
| 5 | Short to High | High V (up to 5V) | High V (up to 5V) | Short to Vbatt |
| 5 | Short to GND | Non-Zero, abnormal | Zero V | Short to GND (V2) |

FIG.3f

| Node # | Failure Mode | measured V1 | measured V2 | diagnosis |
|---|---|---|---|---|
| 6 | Open | High V (up to 5V) | High V (up to 5V) | Short to Vbatt |
| 6 | Short to High | High V (up to 5V) | High V (up to 5V) | Short to Vbatt |
| 6 | Short to GND | Non-Zero, abnormal | Zero V | Short to GND (V2) |

FIG.3g

| Node # | Failure Mode | measured V1 | measured V2 | diagnosis |
|---|---|---|---|---|
| 7 | Open | High V (up to 5V) | High V (up to 5V) | Short to Vbatt |
| 7 | Short to High | High V (up to 5V) | High V (up to 5V) | Short to Vbatt |
| 7 | Short to GND | | | connected to GND in normal state |

FIG.3h

| Node # | Failure Mode | measured V1 | measured V2 | diagnosis |
|---|---|---|---|---|
| 2.4 | Short to Across | | | V1 i equal to V2 special logic is required |
| 2.4 | Stuck Resist. (non-zero) | | | special logic is required |

FIG.3i

| Node # | Failure Mode | measured V1 | measured V2 | diagnosis |
|---|---|---|---|---|
| 6.7 | Short to Across | Non-Zero, abnormal | Zero V | Short to GND (V2) |
| 6.7 | Stuck Resist. (non-zero) | | | special logic is required |

APPARATUS AND METHOD FOR DIAGNOSING FAILURE OF FUEL LEVEL SENSORS

CROSS-REFERENCE TO RELATED APPLICATIONS

The present application is based on, and claims priority from, Korean Application Serial Number 10-2005-0108179, filed on Nov. 11, 2005, the disclosure of which is hereby incorporated by reference herein in its entirety.

FIELD OF THE INVENTION

The present invention relates generally to an apparatus and method for diagnosing the failure of fuel level sensors and, more particularly, to an apparatus and method for diagnosing the failure of fuel level sensors, which detect the disconnection or short circuit of wires between two level sensors provided in a saddle-type fuel tank.

BACKGROUND OF THE INVENTION

In general, a saddle-type fuel tank is provided with two level gauges, that is, a main fuel level sensor and a sub fuel level sensor, and the two level sensors are utilized to measure the fuel level.

However, such a saddle-type fuel system has a problem in that the state of the wires connecting the two level sensors is not accurately diagnosed, therefore the disconnection or short circuit of the wires between the two level sensors cannot be detected. In particular, in North America, the diagnosis of the leakage of evaporated gas and misfires in a fuel system is essential according to OBD-2 regulations. For this purpose, the values detected by fuel level sensors are essentially required for the determination of the amount of fuel, so that monitoring the connection states of wires between fuel level sensors is also essential.

Accordingly, the inventor of the present invention recognizes the necessity of monitoring the connection states of wires between two level sensors provided in a saddle-type fuel system, and has put forth this proposal.

SUMMARY OF THE INVENTION

Embodiments of the present invention provide an apparatus for diagnosing the failure of fuel level sensors, which is provided with wires connecting the contacts of two level sensors and a power train control unit so as to detect the disconnection or short circuit of wires connecting two level sensors provided in a saddle-type fuel tank, and a method of diagnosing the failure of fuel level sensors.

An apparatus for diagnosing the failure of fuel level sensors is provided. The fuel level sensors receive power from a cluster of a vehicle and detect a fuel level in a fuel tank. The apparatus includes a first fuel level sensor mounted in a fuel tank to detect the fuel level of the vehicle and configured such that power is applied to the first end thereof, and a second fuel level sensor connected in series to the second end of the first fuel level sensor at the first end thereof and connected to a ground at the second end thereof. A first failure detection terminal is connected to the power applied to the first fuel level sensor, and a second failure detection terminal is connected to a connection between the first fuel level sensor and the second fuel level sensor. A Power train Control Unit (PCU) is configured to receive signals from the first and second failure detection terminals and diagnose the state of a connection between the first and second fuel level sensors.

A method of diagnosing the failure of fuel level sensors is provided. The fuel level sensors receive power from the cluster of a vehicle and detect a fuel level in a fuel tank. In the method, a PCU receives voltage signals from first and second failure detection terminals, and measures the voltage values of the signals. If, as a result of the determination, the measured voltage is higher than a first set voltage, the state of the measured voltage is diagnosed as a high voltage (Short to High); if the measured voltage is lower than a second set voltage, the state of the measured voltage is diagnosed as a low voltage (Short to GND/OPEN). The connection states of respective nodes between the fuel level sensors for sensing a fuel level are diagnosed based on the diagnosis results.

BRIEF DESCRIPTION OF THE DRAWINGS

For a better understanding of the nature and objects of the present invention, reference should be made to the following detailed description with the accompanying drawings, in which:

FIGS. 3a to 3i are tables illustrating the diagnosis of failures according to the present invention;

DETAILED DESCRIPTION OF THE PREFERRED EMBODIMENTS

The construction of an apparatus for diagnosing the failure of fuel level sensors according to the present embodiment is described with reference to FIG. 1.

Figure 1:
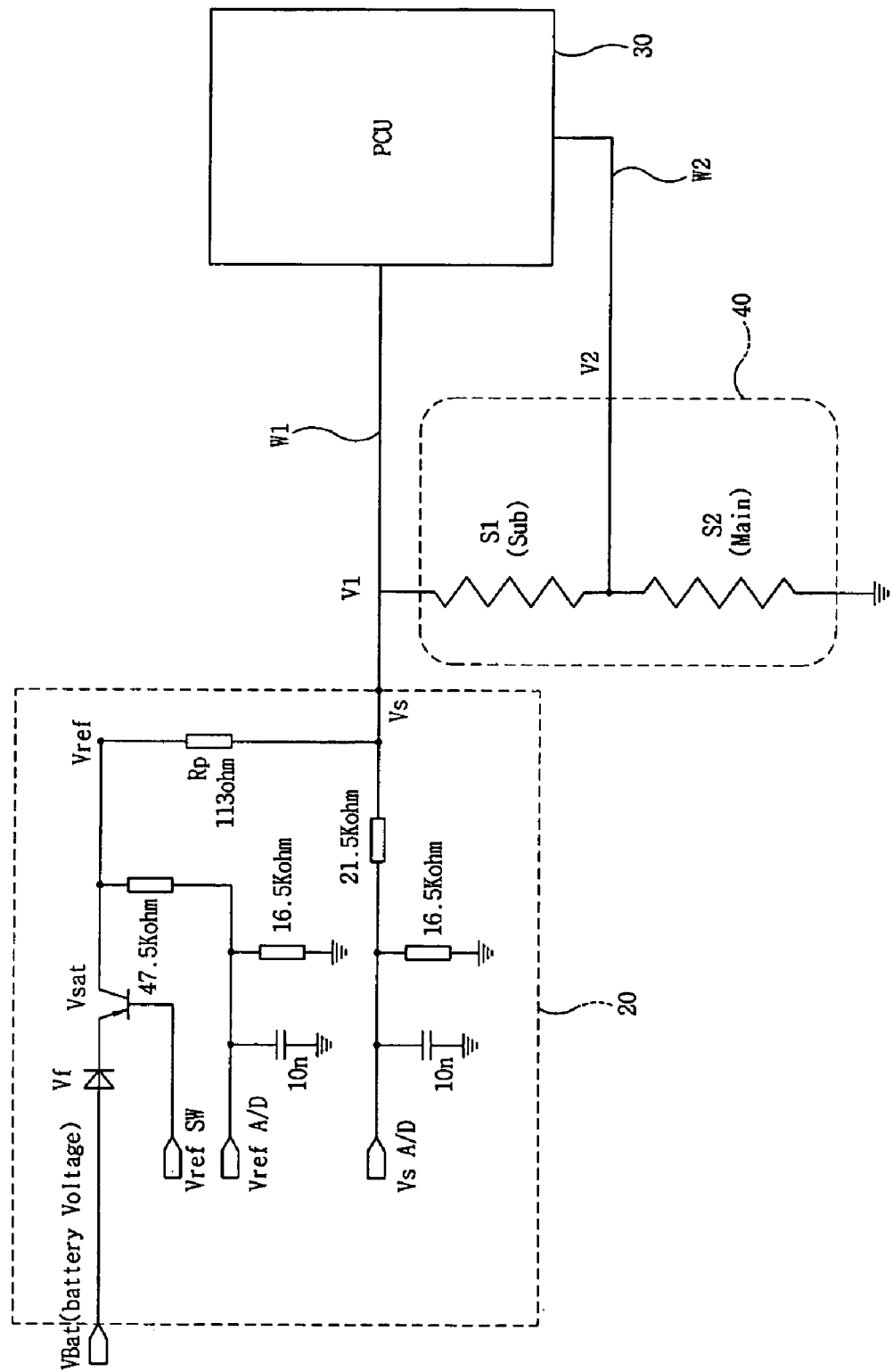
FIG. 1 is a diagram illustrating the construction of a system for diagnosing the failure of fuel level sensors.

As illustrated in FIG. 1, the apparatus for diagnosing the failure of fuel level sensors includes a first fuel level sensor S1 mounted in a fuel tank 40 to receive power Vs from the cluster 20 of a vehicle and detect the fuel level of the vehicle and configured such that power is applied to one end thereof, and a second fuel level sensor S2 connected in series to the other end of the first fuel level sensor S1 at one end thereof and connected to a ground GND at the other end thereof; a first failure detection terminal W1 connected to the power applied to the first fuel level sensor S1, and a second failure detection terminal W2 connected to a connection between the first fuel level sensor S1 and the second fuel level sensor S2; and a PCU 30 configured to receive signals from the first and second failure detection terminals W1 and W2 and diagnose the state of the connection between the first and second fuel level sensors S1 and S2.

In the above construction, the first and second failure detection terminals W1 and W2 are wires connecting the first and second fuel level sensors S1 and S2 of the fuel tank and the PCU 30, and the signals of the failure detection terminals W1 and W2 have voltage values of V1 and V2.

Figure 2:
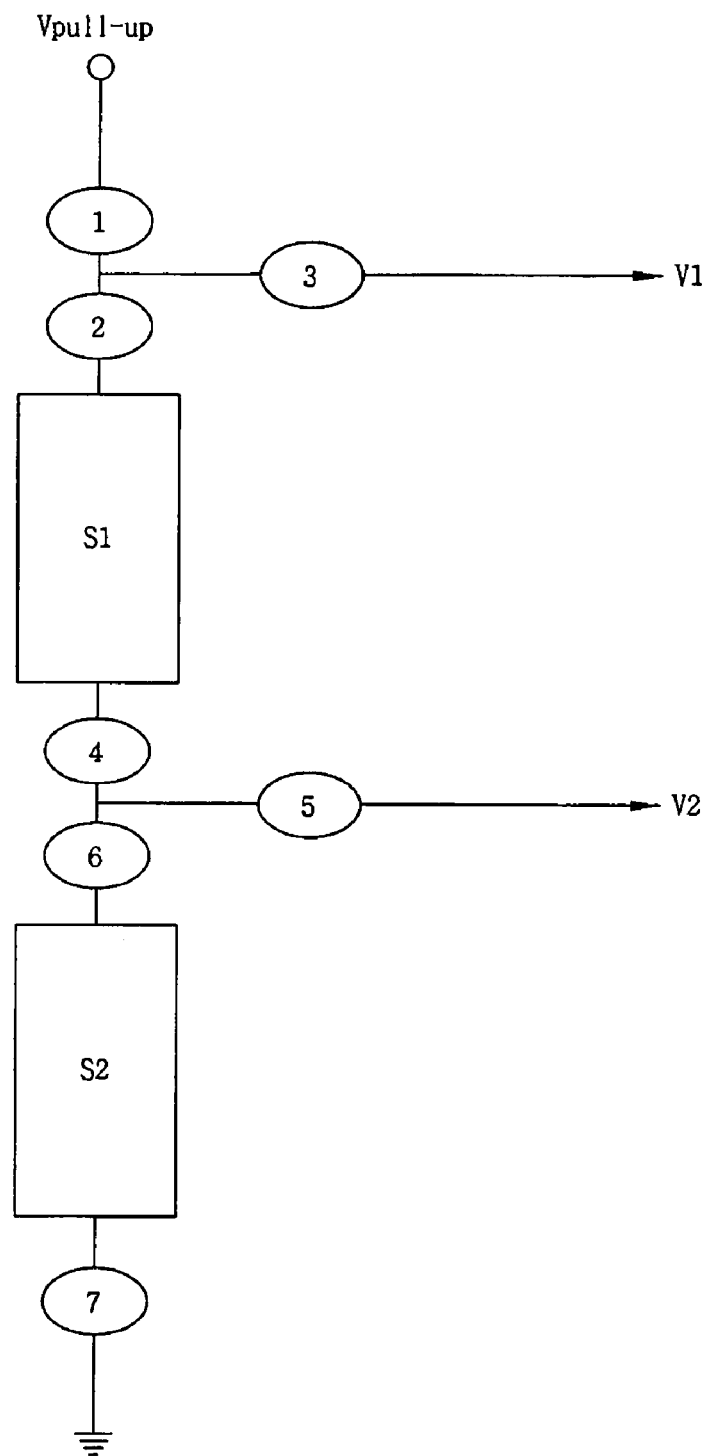
FIG. 2 is a diagram illustrating the construction of the connection of the fuel level sensors according to the present invention.

The first and second fuel level sensors, as illustrated in FIG. 2, are connected in series to each other. A method for diagnosis of respective nodes 1 to 7 in the PCU is as shown in the tables of FIGS. 3a to 3i. Prior to the description of a method for diagnosing the failure, a high voltage, that is, 'Short to High', and a low voltage, that is, 'Short to GND or OPEN', are described in FIG. 2.

The term 'Short to High' refers to the state in which the failure detection terminals W1 and W2 are connected to a battery voltage, and is measured as a 5V or higher voltage in the PCU. The 'Short to GND or OPEN' refers to the state in which the failure detection terminals W1 and W2 are connected to the ground GND or are open, and is measured as 0V or lower voltage in the PCU.

First, as illustrated in FIG. 3a, for node 1, failure modes may be defined as 'Open', 'Short to High' and 'Short to GND'. If, as a result of measurement, both V1 and V2 are measured as 0V, the failure mode of node 1 is regarded as 'Open' mode or 'Short to GND' mode, therefore the states of the first and second fuel level sensors S1 and S2 are all diagnosed as 'Short to GND'. Meanwhile, if, as a result of measurement, V1 and V2 are all measured as a high voltage of 5V, the states of first and second fuel level sensors S1 and S2 all are in 'Short to High' failure mode and, thus, are diagnosed as 'Short to Vbatt (applied voltage (V))'.

That is, as illustrated in the tables of FIGS. 3a to 3i, if, as a result of measurement, V1 and V2 are all measured as 0V, node 1 is in 'Open' or 'Short to GND' failure mode, node 2 is in 'Short to GND' failure mode, or node 3 is in 'Short to GND' failure mode and, thus, the states of the first and second fuel level sensors S1 and S2 are all diagnosed as 'Short to GND' failure mode.

Furthermore, as illustrated in FIG. 3e, the case where the state of only V2 is diagnosed as 'Short to GND' is the case where node 5 is open, in which case only V2 is measured as 0V and V1 is not affected by the state of node 5. Furthermore, in the case where V2 is measured as 0V and V1 is measured as an abnormal value other than 0V, the state of only V2 is diagnosed as the 'Short to GND' failure.

Meanwhile, in FIG. 3h, the 'Short to Across' failure mode is the state in which V1 and V2 are output as the same value, and refers to the state in which nodes 2 and 4 are all short-circuited. In FIG. 3i, the case where V1 is measured as an abnormal value other than 0V and V2 is measured as 0V refers to the state in which nodes 6 and 7 are all short-circuited.

As described above, the general case is diagnosed as 'Short to High' or 'Short to GND or OPEN'. This is illustrated in the flowchart of FIG. 4.

Figure 4:
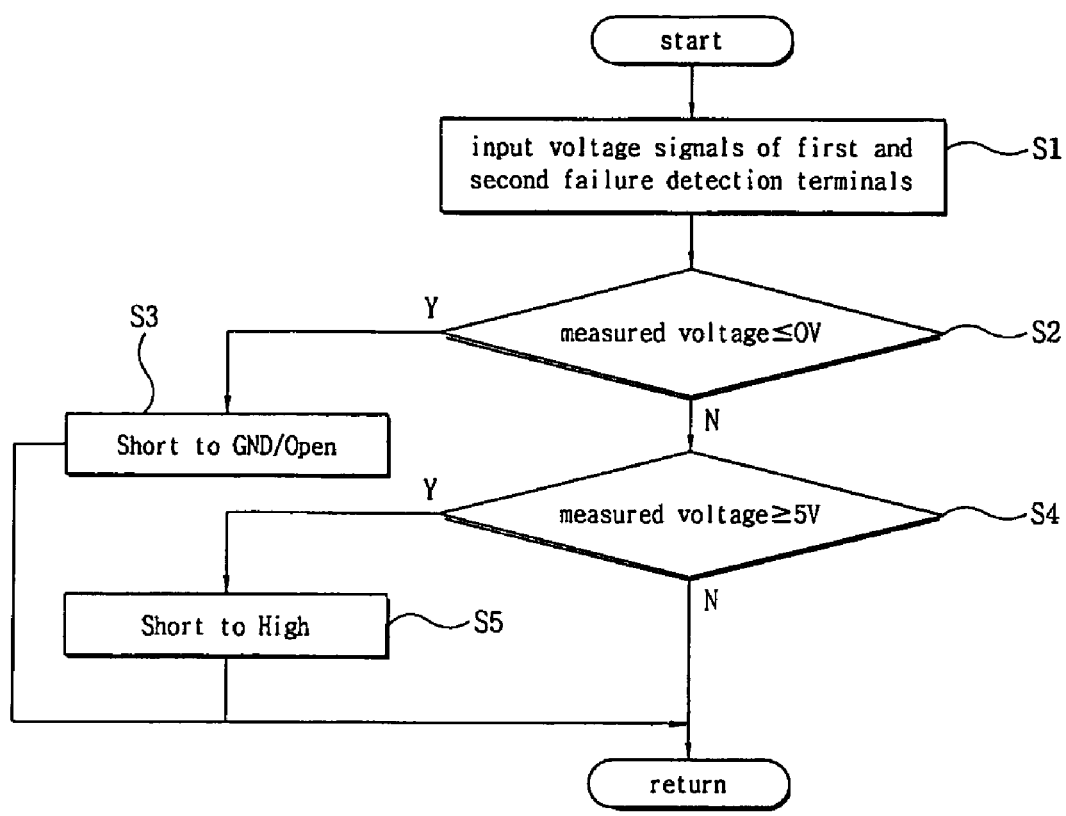
FIG. 4 is a flowchart illustrating a method of diagnosing the failure of fuel level sensors according to the present invention.

As illustrated in FIG. 4, the PCU receives a voltage signal from the first and second failure detection terminals, and measures the voltage value of the signal at step S1.

If, as a result of the determination at step S1, the measured voltage is higher than a first set voltage of 5V, the state of the measured voltage is diagnosed as 'Short to High'. In contrast, if the measured voltage is lower than a second set voltage of 0V, the state of the measured voltage is diagnosed as 'Short to GND/OPEN' at steps S2 to S5.

Thereafter, based on the diagnosis results, the connection states of respective nodes (see FIG. 2) between the fuel level sensors for sensing a fuel level are diagnosed.

Figure 5:
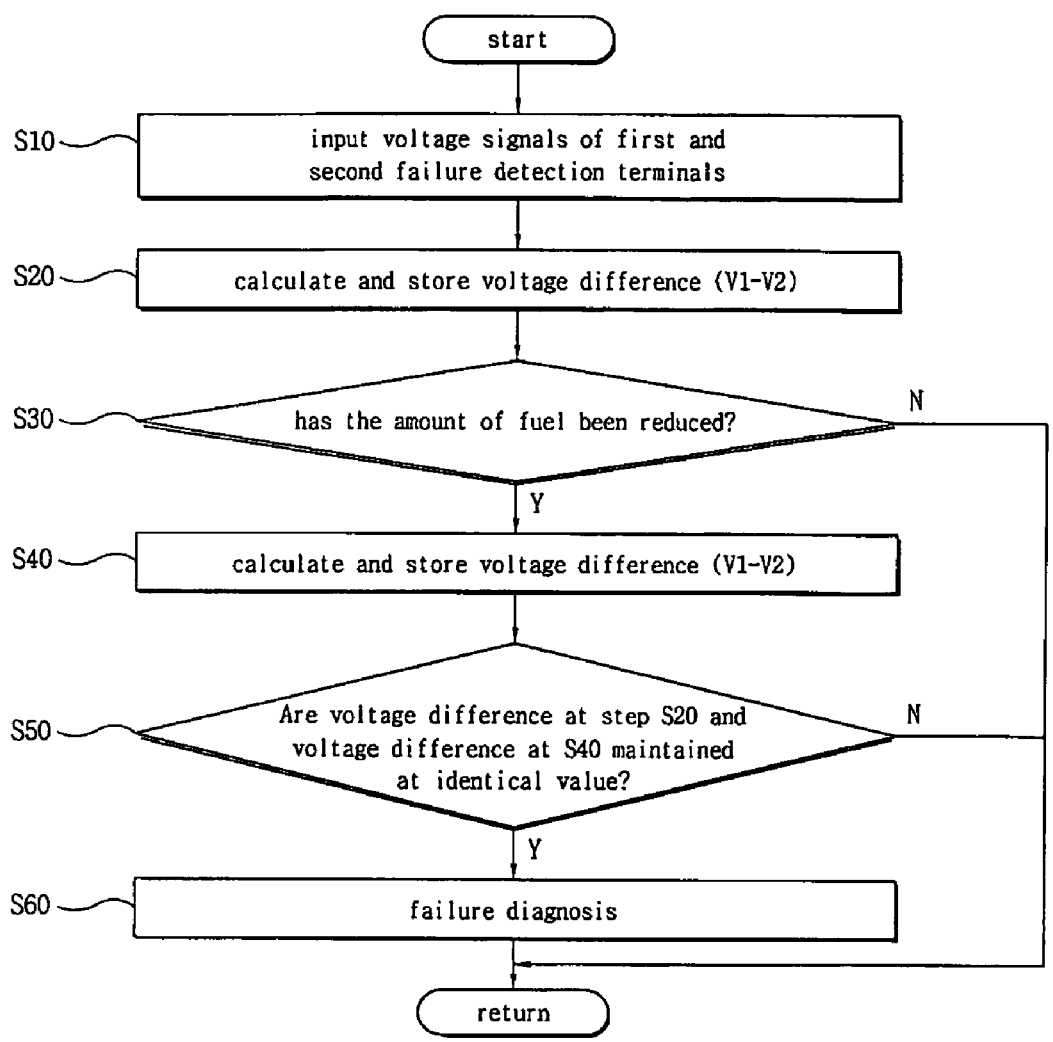
FIG. 5 is a flowchart of a special logic at the time of diagnosing the failure of fuel level sensor failure according to the present invention.

However, as illustrated in FIGS. 3h and 3i, a special logic corresponding to a special failure mode is required, which is illustrated in the flowchart of FIG. 5.

As illustrated in FIG. 5, the PCU receives voltage signals V1 and V2 applied from the first and second failure detection terminals W1 and W2, that is, a voltage signal V1 applied to the first fuel level sensor and a voltage signal V2 applied from the connection terminal between the first and second fuel level sensors, at step S10, and calculates the difference between voltage signals W1 and W2 applied from the first and second failure detection terminals W1 and W2 and stores the difference at step S20.

After the difference between the two applied voltages has been calculated and stored at step S20, whether the amount of fuel has been reduced due to the operation of a vehicle is determined at step S30.

If, as a result of the determination at step S30, the amount of fuel is determined to have been reduced, the difference between two voltage signals V1 and V2 applied from the first and second failure detection terminals is calculated and stored again at step S40.

After the difference between the two applied voltage signals has been calculated and stored at step S40, whether the difference calculated at step S20 and the difference calculated at step at S40 are identical to each other, that is, whether the differences are maintained at the same value, is determined at step S50.

If, as a result of the determination at step S50, the voltage difference obtained before the amount of fuel has been reduced and the voltage difference obtained after the amount of fuel has been reduced are the same, failure diagnosis, that is, the diagnosis of the failure of the first and second fuel level sensors, is performed at step S60. The failure diagnosis at step S60 is the same as illustrated in the tables of FIGS. 3a~3i, and descriptions thereof are omitted here.

Meanwhile, if the amount of fuel has not been reduced at step S30 or the difference between the voltages obtained before and the difference between the voltages obtained after the amount of fuel has been reduced are not maintained at the same value, the failure diagnosis is stopped, and the process returns to the initial step.

The interpretation of the technical scope of the present invention must not be limited to the above-described embodiment, but the technical scope of the present invention must be determined by the interpretation of the appended claims.

In accordance with the apparatus and method for diagnosing the failures of fuel level sensors, an advantage occurs in that the connection states of the wires between the fuel level sensors provided in the fuel tank of a vehicle can be accurately diagnosed.

What is claimed is:

1. A method of diagnosing a failure of fuel level sensors, the fuel level sensors receiving power from a cluster of a vehicle and detecting a fuel level in a fuel tank, comprising the steps of:
   a first measuring step of a Power train Control Unit (PCU) receiving voltage signals from first and second failure detection terminals, and measuring voltage values of the signals;
   if the measured voltage is higher than a first set voltage, diagnosing a state of the measured voltage as a high voltage (Short to High), and if the measured voltage is lower than a second set voltage, diagnosing the state of the measured voltage as a low voltage (Short to GND/OPEN);
   diagnosing connection states of nodes between the fuel level sensors for sensing the fuel level based on the diagnosis results; and
   if the state of the measured voltage is neither the high voltage nor the low voltage:
      a second measuring step of the PCU receiving the voltage signals from the first and second failure detection terminals;

calculating a difference between the voltage signals applied from the first and the second failure detection terminals and storing the difference;

determining whether an amount of fuel is reduced due to driving of a vehicle;

if the amount of fuel is reduced, calculating a difference between voltage signals applied from the first and second failure detection terminals;

determining whether the voltage difference obtained before the amount of fuel has been reduced and the voltage difference obtained after the amount of fuel has been reduced are maintained at an identical value; and if the voltage difference obtained before the amount of fuel has been reduced and the voltage difference obtained after the amount of fuel has been reduced are maintained at an identical value, returning to the first measuring step.

2. The method as defined in claim 1, wherein the first set voltage is 5V.

3. The method as defined in claim 1, wherein the second set voltage is 0V.

4. The method as defined in claim 1, further comprising a step of stopping the failure diagnosis and returning to the second measuring step if the amount of fuel has not been reduced or the voltage difference obtained before the amount of fuel has been reduced and the voltage difference obtained after the amount of fuel are not maintained at an identical value.

* * * * *